United States Patent [19]

Nobata et al.

[11] Patent Number: 5,658,512
[45] Date of Patent: Aug. 19, 1997

[54] METHOD FOR PRODUCING A TIRE FORMING BLADDER

[75] Inventors: Tsuguo Nobata, Higashishirakawa-gun; Junichiro Kawasaki, Shirakawa; Toshihiro Okada, Shirakawa; Yoshie Itoh, Shirakawa, all of Japan

[73] Assignee: Sumitomo Rubber Industries Limited, Hyogo-ken, Japan

[21] Appl. No.: 555,810

[22] Filed: Nov. 9, 1995

[30] Foreign Application Priority Data

Nov. 9, 1994 [JP] Japan .................... 6-275159

[51] Int. Cl.⁶ ............................................ B29C 35/02
[52] U.S. Cl. .................... 264/130; 264/234; 264/326; 264/344; 264/345
[58] Field of Search ........................... 264/130, 131, 264/236, 347, 349, 315, 326, 235, 346, 234, 344, 345

[56] References Cited

U.S. PATENT DOCUMENTS

| | | |
|---|---|---|
| 3,903,947 | 9/1975 | Emerson .................... 152/504 |
| 4,531,902 | 7/1985 | Stuhldreher et al. . |
| 4,534,812 | 8/1985 | Fukui et al. .................... 264/130 |
| 4,554,122 | 11/1985 | Allardice .................... 264/130 |
| 4,822,436 | 4/1989 | Callis et al. . |
| 4,863,650 | 9/1989 | Kohler et al. . |
| 4,943,609 | 7/1990 | Stuhldreher . |

FOREIGN PATENT DOCUMENTS

| | | |
|---|---|---|
| 0399526 | 11/1990 | European Pat. Off. . |
| 2337030 | 7/1977 | France . |
| 835334 | 5/1960 | United Kingdom . |

*Primary Examiner*—Mathieu D. Vargot
*Attorney, Agent, or Firm*—Birch, Stewart, Kolasch & Birch, LLP

[57] ABSTRACT

A method for producing a bladder includes shaping a mass of crude rubber containing an oil component into a specified bladder shape by a mold; vulcanizing the shaped bladder in the mold; removing the vulcanized bladder from the mold; placing the vulcanized bladder in an environment having a high temperature to keep the vulcanized bladder in the high temperature for a specified time to remove the oil component from the vulcanized bladder; and coating an outer surface of the oil component-removed bladder with a separating agent layer.

6 Claims, 1 Drawing Sheet

METHOD FOR PRODUCING A TIRE FORMING BLADDER

BACKGROUND OF THE INVENTION

This invention relates to a method for producing a bladder for use in a tire forming process where a green tire is expandingly formed and vulcanized in a toroidal shape.

Generally, a green tire is placed in a vulcanizing apparatus having upper and lower molding members, and expandingly formed into a toroidal shape. Thereafter, the green tire is vulcanized by heating inner and outer portions of the green tire.

More specifically, the vulcanizing apparatus is provided with a central mechanism for supporting a green tire. The upper and lower molding members are disposed around the central mechanism to mold the green tire into a specified shape. The central mechanism includes a bladder in the form of a rubber bag for expanding the green tire into a toroidal shape.

After mounted on the central mechanism of the vulcanizing apparatus, the green tire is applied with the vulcanizing operation. In the vulcanizing process, vulcanizing medium is supplied into the bladder at a high temperature and high pressure to expand the green tire into a toroidal shape. After a predetermined time, the expanding green tire is restricted by the upper and lower molding members, and kept in a specified toroidal shape. After the vulcanization of the green tire is completed, the upper and lower molding members are separated and the bladder is contracted to enable the vulcanized tire to be removed from the vulcanizing apparatus.

In the vulcanizing apparatus, the bladder is made in close contact with the inner circumferential surface of the green tire for a long time under the conditions of high temperature and high pressure. Accordingly, there is a likelihood that the bladder adheres to the tire. This will make it difficult to remove the vulcanized tire from the bladder of the vulcanizing apparatus.

In order to solve this problem, recently, there has been proposed a measure of coating a separating agent layer on an outer surface of the bladder to assure easy separation between the bladder and the vulcanized tire. However, there is a likelihood that oil components ooze from the bladder and spread in between the outer surface of the bladder and the separating agent layer. As a result, the separating agent layer is liable to peel off from the outer surface of the bladder and the durability of the bladder consequently decreases.

The oil components causing the separating agent layer peeling are softener and plasticizer, such as castor oil, which had been added to crude rubber in the kneading process of the bladder production. To prevent such peeling, there has been proposed a way of reducing the amount of softener and plasticizer in the kneading process. However, the amount of softener and plasticizer is closely related to the workability or the ability of shaping of crude rubber. Accordingly, the reducible amount of softener and plasticizer is limited. Thus, this way has not been sufficiently feasible.

SUMMARY OF THE INVENTION

It is an object of the present invention to provide a method for producing a bladder which has overcome the problems residing in the prior art.

It is another object of the present invention to provide a method for producing a bladder which is capable of suppressing separating agent layer peeling and assures an increased durability of the bladder.

The present invention is directed to a method for producing a bladder comprising the steps of: shaping a mass of crude rubber containing an oil component into a green bladder having a specified shape in a mold; vulcanizing the green bladder while being tightly held in the mold; heating the green bladder for a specified time in a state that an outer surface of the green bladder is free of the mold; and coating the outer surface of the green bladder with a separating agent layer.

The green bladder may be preferably heated in an enclosed space having a specified high temperature. Further, it may be preferable to turn the green bladder in the enclosed high temperature space.

It may be appreciated that the crude rubber is an isobutylene-isoprene rubber, and the separating agent includes silicone resin or fluorine resin.

In the inventive method, a mass of crude rubber is shaped and vulcanized into a green bladder while being tightly held in a mold. The green bladder is heated for a specified time while an outer surface of the green bladder is not tightly held in the mold. The heating process causes the oil component to ooze from the free outer surface of the green bladder, thereby removing the oil component from the green bladder. Thereafter, the oil component-removed green bladder is coated with a separating agent layer. Accordingly, this bladder production method can eliminate the likelihood that the oil component oozes from the bladder which is installed in a tire vulcanizing apparatus and is in the process of vulcanizing a green tire. The separating agent layer can be kept on the outer surface of the bladder for a long time because there is no likelihood that the oil component oozes from the bladder even under the high temperature condition of the tire vulcanizing operation. Thus, this inventive method can produce a bladder having an increased durability or life.

The heating of the green bladder in an enclosed space will assure the high thermal efficiency because the supplied thermal energy is enclosed. Also, the turning of the green in the enclosed high temperature space will ensure uniform heating of the green bladder.

Further, the use of isobutylene-isoprene rubber for crude rubber and silicone resin or fluorine resin for separating agent will increase the separating performance between the bladder and the green tire in the tire vulcanizing apparatus.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
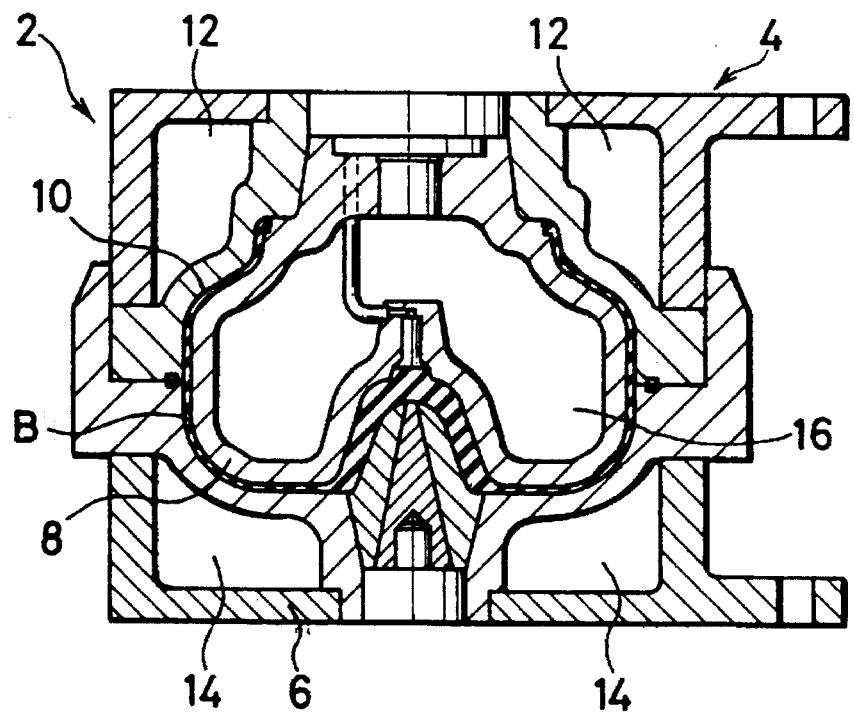
FIG. 1 is a sectional diagram showing a vulcanizing unit which is used in a bladder producing method embodying the present invention.
Figure 2:
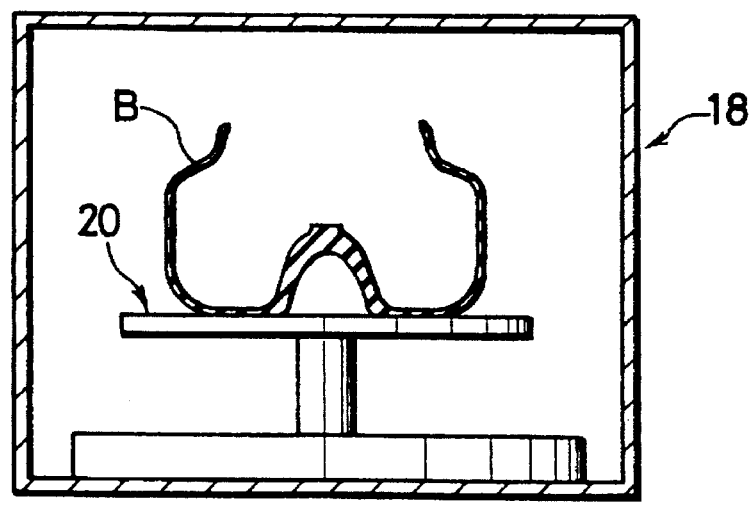
FIG. 2 is a sectional diagram showing a heating unit which is used in the bladder producing method.

An embodiment of the present invention will be described with reference to the accompanying drawings. FIG. 1 is a sectional diagram showing a construction of a vulcanizing unit for shaping and vulcanizing a bladder, and FIG. 2 is a sectional diagram showing a construction of a heating unit for heating the shaped bladder.

The vulcanizing unit is indicated at 2, and comprises an upper molding member 4, a lower molding member 6, and an intermediate molding member 8. Crude rubber is placed in a cavity 10 defined between the upper molding member 4 and the intermediate molding member 8, and between the lower molding member 6 and the intermediate molding member 8 to form a bladder having a specified shape.

Specifically, a mass of crude rubber is placed in the vulcanizing unit 2 in a state where the molding members 4, 6 and 8 are set in their respective opened positions. Thereafter, the molding members 4, 6 and 8 are set in their respective closed position to thereby pressingly spread the mass of crude rubber in the entire cavity 10. In this embodiment, the crude rubber is isobutylene-isoprene rubber. The crude rubber is added with softener and plasticizer to thereby give the crude rubber a specified level of viscosity or shaping ability.

After the molding members 4, 6, and 8 are set in the closed positions, steam is filled inside hollow portions 12, 14, and 16 formed in the molding members 4, 6, and 8, respectively, so that the molding members 4, 6, and 8 are heated by the steam in the respective hollow portions 12, 14, and 16. Consequently, the crude rubber placed in the cavity 10 is formed into a bladder B having a specified shape while being vulcanized.

Subsequently, the bladder B is taken out from the mold members of the vulcanizing unit 2 and transported to the heating unit 18. The heating unit 18 has an enclosed space into which appropriate heating medium is supplied. The enclosed space of the heating unit 18 is kept at a high temperature, for example, about 180° C. The enclosed space is preferable to keep the supplied thermal energy. The bladder B is placed on a turntable 20 provided in the enclosed space of the heating unit 18 for a specified period of time. The turntable 20 is turned to heat an overall of the bladder B uniformly.

Upon completion Of the heating, the bladder B is transported to a drying unit where the bladder B is dried. Thereafter, the bladder B is coated with a separating agent layer over an outer surface of the bladder B in a coating unit. More specifically, the separating agent includes silicone resin or fluorine resin and is applied to the outer surface of the bladder B which is to be brought in close contact with an inner circumferential surface of a green tire. In this way, a bladder B is produced.

As mentioned above, the bladder B is obtained by heating a vulcanized and shaped rubber article for the specified time in the enclosed space and thereafter coating it with a separating agent layer. Compared to bladders produced by the conventional method, the bladder B is advantageous in that the separating agent layer peeling is not liable to occur, and thus has an increased durability.

More specifically, bladders produced by the conventional method has the drawbacks that during the vulcanizing of green tire, oil components such as softener and plasticizer, ooze from the bladder and spread in between the outer surface of the bladder and the separating agent layer, resulting in a peeling of the separating agent layer from the bladder. In this embodiment, however, the vulcanized article is heated in an enclosed space before being coated with a separating agent layer on the outer surface thereof. Consequently, oil components such as softener and plasticizer are oozed from the vulcanized article in the heating unit, and then vaporized and removed from the outer surface of the bladder. Accordingly, the bladder produced in this embodiment has no likelihood that oil components spread in between the outer surface of the bladder and the separating agent layer in the vulcanizing operation of green tire.. Accordingly, the separating agent layer can be prevented from peeling off from the outer surface of the bladder. Thus, the bladder produced by the present invention has an increased durability. This advantageous effects can be clearly seen from experiment data to be referenced later.

Further, in this embodiment, the oil components of the bladder B are removed after the shaping of the bladder in the vulcanizing unit. Hence, the removal of the oil components of softener and plasticizer will not reduce the workability or the shaping ability of crude rubber which is necessary for the shaping of crude rubber into the specified bladder shape.

Table 1 shows comparisons between bladders produced by the conventional method and bladders produced by the method of the present invention. Table 1 has the following measurement items: vulcanization time of forming a bladder, heating time of heating a formed bladder, extracted amount of oil components extracted by acetone, and durability of a bladder. Bladders I and II were produced by the conventional method while bladders III and IV were produced by the method of the present invention.

The respective extracted amounts and durabilities of the bladders II to IV are represented as relative value to those of the bladder I which are given a reference value of 100. The extracted amounts were obtained by immersing each bladder in a solution mainly composed of acetone for a specified time and measuring an amount of oil components which were extracted out from the bladder immersed in the solution.

TABLE 1

|  | Bladder I | Bladder II | Bladder III | Bladder IV |
| --- | --- | --- | --- | --- |
| Vulcanization Time (min.) | 45 | 60 | 30 | 20 |
| Heating Time (min.) | 0 | 0 | 30 | 40 |
| Extracted Amount | 100 | 92 | 45 | 34 |
| Durability | 100 | 97 | 133 | 132 |

As can be clearly seen from Table 1, the inventive bladders III and IV which were heated between the coating of a separating agent layer and the shaping and vulcanizing show an extremely reduced extracted amount of oil components compared to the conventional bladders I and II which were not heated between the coating of a separating agent layer and the shaping and vulcanizing. This clearly shows that the heat treatment before the separating agent coating after the shaping and vulcanizing effectively removes oil components from the shaped and vulcanized bladder. Further, the inventive bladders III and IV have durability greater than the conventional bladders I and II which were not applied with the heat treatment before the separating agent coating.

Although the present invention has been fully described by way of example with reference to the accompanying drawings, it is to be understood that various changes and modifications will be apparent to those skilled in the art.

Therefore, unless otherwise such change and modifications depart from the scope of the invention, they should be construed as being included therein.

What is claimed is:

1. A method for producing a bladder comprising the steps, in the sequential order set forth, of:

shaping a mass of crude rubber containing an oil component into a green bladder having a specified shape in a mold;

vulcanizing the green bladder while being tightly held in the mold;

heating the vulcanized bladder for a specified time in a state that an outer surface of the vulcanized bladder is free of the mold such that the oil component oozes from and vaporizes from the outer surface; and coating the outer surface of the vulcanized bladder with a separating agent layer.

2. The method as defined in claim 1, wherein the heating of the vulcanized bladder is carried out in an enclosed space having a specified temperature.

3. The method as defined in claim 2, wherein the vulcanized bladder is turned in the enclosed spaced while being heated.

4. The method as defined in claim 1, wherein the crude rubber is isobutylene-isoprene rubber.

5. The method as defined in claim 4, wherein the separating agent includes silicone resin.

6. The method as defined in claim 4, wherein the separating agent includes fluorine resin.

* * * * *